Sept. 11, 1923.
G. A. LYON
REAR BUFFER ATTACHMENT
Original Filed April 17, 1922
1,467,387
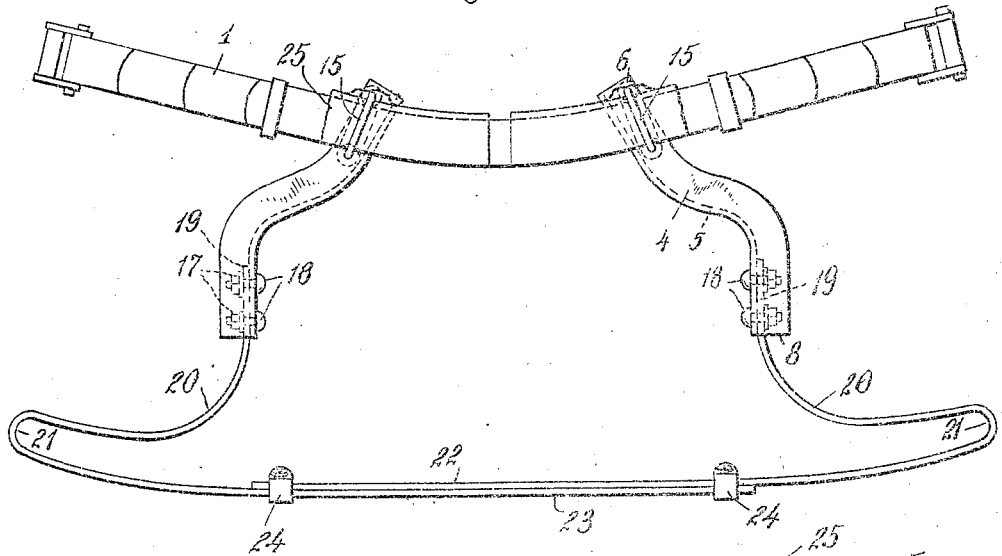
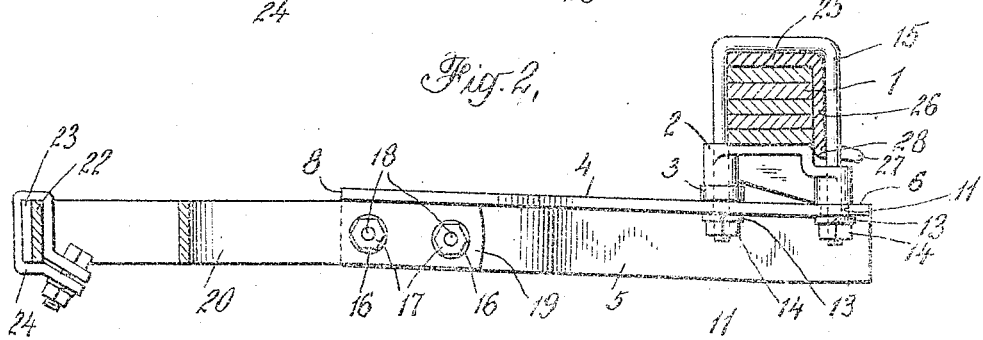
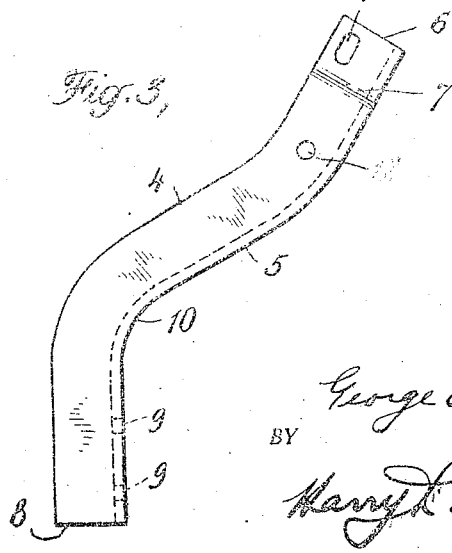
INVENTOR
George Albert Lyon
BY
Harry L. Duncan
ATTORNEY.

Patented Sept. 11, 1923.

1,467,387

UNITED STATES PATENT OFFICE.

GEORGE ALBERT LYON, OF PHILADELPHIA, PENNSYLVANIA.

REAR BUFFER ATTACHMENT.

Application filed April 17, 1922, Serial No. 554,094. Renewed May 14, 1923.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Rear Buffer Attachments, of which the following is a specification, taken in connection with the accompanying drawing, which forms part of same.

This invention relates especially to attaching devices for attaching resilient buffers or bumpers to the rear of Overland or similar automobiles and comprises special buffer attaching brackets adapted to be engaged by the regular spring U-bolts and thereby clamped in substantially rigid position beneath the rear spring. These brackets diverge as they extend rearward from their clamping ends and preferably have substantially parallel free attaching ends to which the attaching members of the buffer may be bolted or otherwise connected. These attaching brackets which may with advantage be formed of tempered spring steel, are preferably provided with stiffening flanges on their inner edges, for example, so as to also serve as vertical contact faces to which the attaching members of the buffer may be bolted.

In the accompanying drawing which shows in a somewhat diagrammatic way an illustrative embodiment of this invention:

Fig. 1 is a top view.

Fig. 2 is a vertical sectional view on an enlarged scale, and

Fig. 3 is a top view of one of the attaching brackets.

The attaching brackets used in this device are preferably formed of spring steel plate or strip $\frac{3}{16}$ of an inch thick more or less and preferably, though not necessarily, hardened and tempered after they have been cut and bent into shape in suitable dies or otherwise. As is shown in Figs. 1 and 3, the clamp end 6 of the attaching bracket may have an upper or substantially horizontal clamping face 7 in which the bolt holes or apertures 11, 12 are formed so as to properly cooperate with the lower ends of the usual spring bolts 15 of these Overland automobiles. As indicated in Fig. 2 these rear spring bolts extend around the spring leaves 1 and the sheet steel spring support 25 which may have a depending flange 26 formed with a forward projection such as 27 in which a hole 28 may be provided through which this forward leg of the U-bolt extends. A bridging U-bolt clamp 2 may be arranged below the spring and formed with holes through which these shanks of the U-bolt extend and in applying this attachment the nuts 14 may be disengaged from one of these U-bolts and the attaching bracket put in place so that the U-bolt shanks extend through the holes or apertures 11, 12 before the nuts 14 and the lock washers 13 are replaced and tightened, a spacer washer 3 being first applied to the rear shank of the U-bolt where the clamping end is substantially horizontal and does not follow the upward inclination of this clamp 2.

In this way the clamping end of each of the attaching brackets may be securely and substantially rigidly connected to the automobile spring and frame members and an inner flange such as 5 on each of the clamping brackets at least adjacent its clamping end stiffens the same so that undesirable vertical yield is thus prevented. As shown in Fig. 1, the attaching brackets preferably diverge at their middle portions 4 and are then bent at about the points 10 into substantially parallel position adjacent their rear attaching ends 8 which may be provided with attaching holes or apertures 9 through which the attaching bolts 18 may extend. These bolts may also extend through similar apertures in the end 19 of the attaching member 20 of the buffer so that when the nuts 17 and lock washers 16 are in place and tightened the end of the attaching member is securely clamped to this flange and also preferably drawn up against the horizontal face or aligning portion of this attaching end of the bracket.

The buffer may have any desired or suitable construction and preferably comprises the steel strip attaching members 20 which may be hardened and tempered in some cases and formed with the end loops 21 and the integral or other inturned impact receiving members 22, 23 which may be adjustably or otherwise connected as by the enclosing clips 24.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims.

I claim:

1. In automobile buffer devices, a spring steel buffer comprising attaching members, cooperating angular sectioned stiffened sheet steel attaching brackets, each having adjacent one end a substantially flat upper clamping surface adapted to fit beneath the rear spring U-bolt of an Overland automobile and formed with bolt apertures through which said bolt extends to clamp said bracket in position, a spacer arranged adjacent one shank of said U-bolt to vertically align the corresponding portion of the bracket, said brackets being bent into diverging form adjacent their middle portions and having substantially parallel rear attaching ends formed with attaching apertures and attaching bolts extending through the apertures in said attaching ends and the attaching members of the buffer to securely connect them together.

2. In automobile buffer devices, a spring steel buffer comprising attaching members, cooperating angular sectioned sheet steel attaching brackets, each having adjacent one end a substantially flat upper clamping surface adapted to fit beneath the rear spring U-bolt of an Overland automobile and formed with bolt apertures through which said bolt extends to clamp said bracket in position, said brackets being bent into diverging form adjacent their middle portions and having substantially parallel rear attaching ends.

3. In automobile buffer devices, a buffer comprising attaching members, cooperating attaching brackets, each having adjacent one end an upper clamping surface adapted to fit beneath the rear spring bolt of an Overland or generally similar automobile and formed with bolt apertures through which said bolt extends to clamp said bracket in position, a spacer cooperating with one shank of said U-bolt to vertically align the corresponding portion of the bracket, said brackets having vertical stiffening flanges and having substantially parallel rear attaching ends formed with attaching means and attaching bolts extending through the apertures in said attaching ends and the attaching members of the buffer to securely connect them together.

4. In automobile buffer devices, a buffer comprising attaching members, cooperating attaching brackets, each having an upper clamping surface adapted to fit beneath the rear spring bolt of an Overland or generally similar automobile and formed with bolt apertures through which said bolt extends to clamp said bracket in position, said brackets having vertical stiffening flanges and having rear attaching ends formed with attaching means.

5. In automobile buffer attaching devices, tempered spring steel attaching brackets having substantially horizontal upper faces and vertically depending inner flanges to stiffen the bracket and form attaching contact faces at their substantially parallel rear ends to which the buffer attaching members may be connected, the opposite clamping ends of said brackets being formed with holes adapted to accommodate the spring U-bolts of an automobile to substantially rigidly clamp said brackets adjacent the rear spring thereof.

6. In automobile buffer attaching devices, steel attaching brackets having substantially flat upper faces and depending inner flanges to stiffen the bracket and form attaching contact faces at their rear ends to which the buffer attaching members may be connected, the opposite clamping ends of said brackets being formed with holes adapted to accommodate the spring U-bolts of an automobile to substantially rigidly clamp said brackets adjacent the rear spring thereof.

7. In automobile buffer attaching devices, sheet steel attaching brackets having depending inner flanges to stiffen the brackets and form attaching contact faces at their rear ends to which buffer attaching members may be connected, the opposite clamping ends of said brackets being formed with holes adapted to accommodate the spring bolts of an automobile to substantially rigidly clamp said brackets adjacent the rear spring thereof.

8. In automobile buffer attaching devices, sheet steel attaching brackets having depending flanges to stiffen the brackets and form attaching contact faces to which buffer attaching members may be connected, the opposite clamping ends of said brackets being formed to cooperate with the spring bolts of an automobile to substantially rigidly clamp said brackets adjacent the rear spring thereof.

GEORGE ALBERT LYON.